US012039319B1

(12) United States Patent
Leung et al.

(10) Patent No.: US 12,039,319 B1
(45) Date of Patent: Jul. 16, 2024

(54) AUTOMATIC DEPLOYMENT OF UPDATES FOR EDGE DEVICE SOFTWARE COMPONENTS BASED ON EDGE USAGE LIMITS

(71) Applicant: Amazon Technologies, Inc., Seattle, WA (US)

(72) Inventors: Hok Peng Leung, Woodinville, WA (US); Robert Battle, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 17/710,767

(22) Filed: Mar. 31, 2022

(51) Int. Cl.
*G06F 8/65* (2018.01)
*G06F 11/36* (2006.01)

(52) U.S. Cl.
CPC ............ *G06F 8/65* (2013.01); *G06F 11/3688* (2013.01)

(58) Field of Classification Search
CPC .............................. G06F 8/65; G06F 11/3688
USPC .................................................. 717/168–174
See application file for complete search history.

(56) References Cited

U.S. PATENT DOCUMENTS

| | | | | |
|---|---|---|---|---|
| 8,522,083 | B1* | 8/2013 | Cohen | G06F 9/44589 717/125 |
| 8,677,315 | B1* | 3/2014 | Anderson | G06F 8/60 717/124 |
| 10,055,200 | B1* | 8/2018 | Russell | G06F 11/3696 |
| 10,334,029 | B2* | 6/2019 | Agrawal | H04L 67/10 |
| 10,416,988 | B1* | 9/2019 | Kulchytskyy | G06F 13/36 |
| 10,430,318 | B1* | 10/2019 | Ansari | G06F 11/3676 |
| 10,467,045 | B1* | 11/2019 | Braverman | H04L 47/726 |
| 11,140,029 | B1* | 10/2021 | Singhal | H04L 41/0893 |
| 11,188,376 | B1* | 11/2021 | Alexander | G06F 9/45545 |
| 11,243,516 | B2* | 2/2022 | Gelbke | H04L 67/10 |
| 11,405,361 | B1* | 8/2022 | Saalfeld | H04L 63/0272 |
| 11,567,466 | B1* | 1/2023 | Galvez | H04W 4/029 |
| 11,614,927 | B2* | 3/2023 | Yamato | G06F 8/41 717/177 |
| 11,640,292 | B2* | 5/2023 | Ward | H04W 4/70 717/173 |

(Continued)

OTHER PUBLICATIONS

Toro-Betancur et al, "A Scalable Software Update Service for IoT Devices in Urban Scenarios", ACM, pp. 1-8 (Year: 2019).*

(Continued)

*Primary Examiner* — Anil Khatri
(74) *Attorney, Agent, or Firm* — Robert C. Kowert; Kowert, Hood, Munyon, Rankin & Goetzel, P.C.

(57) ABSTRACT

An update deployment service performs automatic testing and deployment of a software update (e.g., security patches) for a software component on a fleet of IoT devices, without the need for the client to test the update and manually deploy the update to the IoT devices. A client configures the service by providing an upper usage limit for certain IoT hardware components (e.g., memory, hard disk) and/or code components (e.g., threads) that may be caused by any future updates. When a new update is available for deployment, the update deployment service obtains usage test data that indicates the amount of usage (or increase in usage) of the IoT hardware and/or code for the new update. If the usage (or increase in usage) is within the client-provided usage limits, then the service automatically deploys the update to the fleet of edge devices.

20 Claims, 7 Drawing Sheets

(56) References Cited

U.S. PATENT DOCUMENTS

| | | | |
|---|---|---|---|
| 11,656,864 B2* | 5/2023 | Chen | G06F 8/63 717/168 |
| 11,755,305 B2* | 9/2023 | Parra | G06N 20/10 717/168 |
| 2016/0364223 A1 | 12/2016 | Vandikas et al. | |
| 2017/0322790 A1 | 11/2017 | Surdu | |

OTHER PUBLICATIONS

Yohan et al, "An Over-the-Blockchain Firmware Update Framework for IoT Devices", IEEE, pp. 1-8 (Year: 2018).*
Josilo et al, "Joint Allocation of Computing and Wireless Resources to Autonomous Devices in Mobile Edge Computing", ACM, pp. 13-18 (Year: 2018).*
Taleb et al, "On Multi-Access Edge Computing: A Survey of the Emerging 5G Network Edge Cloud Architecture and Orchestration", IEEE, pp. 1657-1681 (Year: 2017).*
Guan et al, "A Model-Based Testing Technique for Component-Based Real-Time Embedded Systems", IEEE, pp. 1-10 (Year: 2015).*
Song et al, "Model-Based Fleet Deployment of Edge Computing Applications", ACM, pp. 1-11 (Year: 2020).*
A Software-Defined IoT Device Management Framework for Edge and Cloud Computing, IEEE pp. 1718-1735 (Year: 2020).*

* cited by examiner

| | Edge Device Type 302 | |
|---|---|---|
| ☐ | Hardware Configuration A | Software Configuration A |
| ☑ | Hardware Configuration A | Software Configuration B |
| ☐ | Hardware Configuration B | Software Configuration C |
| ☐ | Hardware Configuration C | Software Configuration D |
| ☐ | Hardware Configuration C | Software Configuration E |

Please select the type of edge device you would like to set usage limits for:

FIG. 3

AUTOMATIC DEPLOYMENT OF UPDATES FOR EDGE DEVICE SOFTWARE COMPONENTS BASED ON EDGE USAGE LIMITS

BACKGROUND

The Internet of Things (IoT) is a phrase given for the interconnection of computing devices scattered around the globe within the existing internet infrastructure. Clients of a remote service provider may use various software components on IoT devices (also referred to herein as edge devices) to implement an execution environment/operating system, to collect data such as sensor measurements, to process collected data, and/or to send data to the service provider for processing at the cloud.

When a service provider releases a software update for a software component (e.g., a security patch or performance patch for a particular component of an IoT execution environment), clients may download the update from the service provider and install the update on each IoT device that uses the software component. A client may have a large number of IoT devices (up to millions of devices). Therefore, it may be a burdensome and time-consuming process for a client to deploy the update to many different IoT devices. Furthermore, the client may need to spend time testing the update on some test devices in order to find out how much of an impact the update will have on the performance of hardware components of the IoT device. This testing process can also become quite burdensome, error-prone, and time-consuming, particularly for clients that use large numbers of IoT devices.

BRIEF DESCRIPTION OF THE DRAWINGS

FIG. 3 is an illustration of a user interface for a client to indicate the type of edge device to set usage limits for, according to some embodiments.

Figure 1:
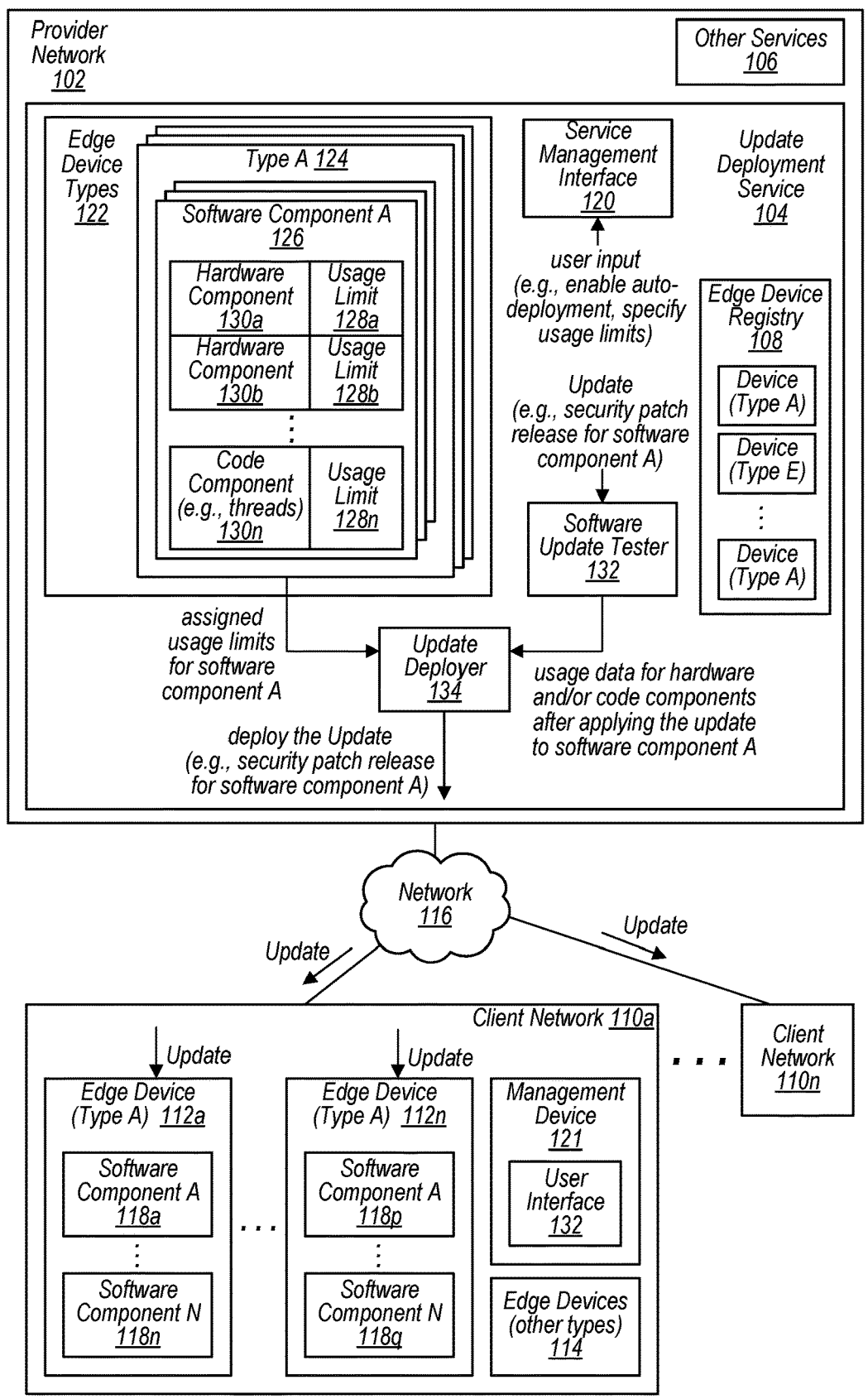
FIG. 1 is a logical block diagram illustrating a system for automatic deployment of updates for edge device software components based on edge usage limits, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments for automatic deployment of updates for a software component installed on edge devices (e.g., a component of an operating system) based on edge usage limits, according to some embodiments. In embodiments, an update deployment service may automatically determine whether or not to deploy a software update (e.g., a security-related patch release or critical update/patch) to a software component installed on edge devices of a particular type (e.g., edge devices that have a particular hardware and/or software configuration) based on edge usage limits assigned to edge components for the particular type of edge device (e.g., hardware components and/or a code components).

In various embodiments, the software update may be for a third-party software component of software, such that the software (and its different components) is not developed or provided by a service provider that provides the update deployment service for use by a client/customer. Therefore, the service provider (e.g., owner/operator of the provider network) and the client/customer may have no control over the development and/or the release schedule for updates for the software, including any of its software components. In other words, the service provider (e.g., the update deployment service) may manage deployment of third-party software updates (e.g., patches) which neither the client/customer nor the service provider have any control over (e.g., with respect to update management, development, release, etc.).

As an example, a client may have an operating system installed on each device of a fleet of edge devices. The operating system may be developed/provided by Company A. Company B may be a service provider that implements the update deployment service for use by the client/customer. When Company A releases an update for a software component of the operating system, then the update deployment service may obtain the update and deploy the update to the edge devices of the client/customer (either automatically or manually, as described herein).

In some embodiments, the software update may be for a software component of software, such that the software (and its different components) is developed and/or provided by the same service provider that provides the update deployment service. In embodiments, the update deployment service may be used as described herein to provide automatic deployment of software updates for any number of components of software developed/provided by the service provider and/or automatic deployment of third-party software updates for any number of components software developed/provided by a third party (e.g., a party other than the service provider and the client/customer). Therefore, various embodiments may include deployment of updates for any combination of service provider software and/or third-party software installed on edge devices.

As discussed herein, in some embodiments, the update deployment service may receive, from a client, an indication of approval for automatic application of updates (e.g., third-party updates/patch updates) to one or more particular software components (or any software components of a particular software) of edge devices for a particular type of edge device, as well as receive an indication of limits for usage and/or increase in usage for any number edge component(s) of the edge devices. As discussed in more detail below, this may allow a client/customer to enable automatic updates for software component(s) of any number of edge devices (e.g., a fleet of edge devices of a particular type), if edge usage data (e.g., test data) indicates that usage and/or increase in usage for the edge component(s) is within assigned limits assigned to the edge component(s).

In embodiments, edge components may include any number of hardware components (e.g., a memory, processor/CPU, disk storage, and/or network I/O component) and/or any number of code components that are used to execute software code (e.g., a software, execution or runtime environment, or OS-related function or construct that is used to execute a software component, such as threads (e.g., concurrent threads of execution within processes of the edge device)). This allows a client to avoid the need to manually deploy the update and/or manually test the update before deployment, as is done using traditional techniques. The techniques described herein also reduce or eliminate the need for a client to use hardware and/or software testing resources, avoiding the additional time, expense, and errors associated with traditional techniques.

In some embodiments, after a client/user has enabled the service (e.g., granted permission) to perform automatic deployment of updates, the service may automatically deploy future updates based on edge usage limits without any input/actions performed by the client. Therefore, the process of deploying updates to edge devices will be performed outside of the user's (client's) control and/or outside of the service provider's control (unless the user/client disables automatic updates at some later point in time).

In some embodiments, an update deployment service may assign an upper limit for increase in usage of an edge component(s) and/or an upper limit for the usage of an edge component(s) caused by application of a given update to a software component for a type of edge device (e.g., any update that may become available for deployment). In embodiments, the upper limit for increase in usage may be a limit for the increase in usage of the edge component by the software component or a limit for the increase in total usage of the edge component. In various embodiments, the upper limit for usage may be a limit for usage of the edge component by the software component or a limit for total usage of the edge component. In embodiments, the assigned upper limit for increase in usage of one or more edge components and/or the assigned upper limit for the usage of the one or more edge components may be referred to as a usage profile limit.

For a given software component, the usage limits for edge components may be specified/indicated by a user as percentages or as numerical values that indicate the usage of the edge component. As a hardware component example, the limit for increase in usage of a hard disk (due to application of an update) may be specified as a 10% increase in storage space or as a 100 GB increase in storage space. Similarly, the limit for usage of the hard disk (total usage after application of an update) may be specified as 50% or as 500 GB. As a code component example, the limit for increase in usage of concurrently executing threads (due to application of an update) may be specified as 2 threads, and the limit for usage of concurrently executing threads (total usage after application of an update) may be specified 8 threads.

At some point in time, the update deployment service may obtain edge usage data for any number of edge components (e.g., hardware usage metrics for memory, processor/CPU, disk storage, network I/O component, and/or any number other hardware components and/or code usage metrics for any number of code components) that indicates the increase in usage of the edge component(s) caused by application of a particular update to the software component or the usage for the edge component(s) after the application of the particular update to the software component. If the increase in usage or the usage is within the upper limit assigned to the edge component(s), then the update deployment service deploys the particular update to the edge devices of the type of edge device (e.g., edge devices that have a particular hardware and/or software configuration).

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 7 and described below.

This specification begins with a description of a system for automatic deployment of updates for edge device software components based on edge usage limits. A number of different methods and techniques for automatically deploying updates for edge device software components based on edge usage limits are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for automatic deployment of updates for edge device software components based on edge usage limits, according to some embodiments.

As shown, a provider network 102 includes an update deployment service 104 that implements automatic deployment of updates for edge device software components based on edge usage limits. In the example embodiment, the provider network 102 also includes any number of other services 106, such as compute services and/or storage services. In embodiments, any of the compute and/or storage functionality described for the update deployment service 104 may be provided, at least in part, by one or more of the other services 106. For example, another IoT service may maintain a database of all the registered edge devices for each client of the update deployment service 104.

In the depicted embodiment, the update deployment service 104 includes an edge device registry 108 that stores data for any number of edge devices of each client of the service. The data may include identification data that uniquely identifies each edge device with respect to other edge devices of a client, as well as any other type of data that describes the edge device. As shown, the edge device registry 108 stores data for two edge devices of type A and another edge device of type E. In embodiments, each type of an edge device may indicate a different combination of one or more hardware components and/or one or more software components of the edge device (e.g., any number of hardware components and/or software components installed on the edge device).

In embodiments, any number of clients of the update deployment service 104 may each have one or more client networks 110, and a given client network may include any number of edge devices. For example, client network 110a of a client includes edge devices 112 of a particular type (Type A) as well as any number of edge devices 114 of other types (Type B, Type C, etc.). In embodiments, clients of the update deployment service 104 may use the update deployment service 104 by communicating with the provider network 102 from a remote client network 110 of the corresponding client (e.g., via a wide area network 116, such as the internet).

As shown, a given edge device may include any number of software components (e.g., components of an operating system or execution environment such as a log manager component, a stream manager component, etc.) that may be installed and/or executed on the edge device. In embodiments, software component A 118a through software component N 118n of edge device 112a may be the same as software component A 118p through software component N 118q of edge device 112n (e.g., the same corresponding components of a particular operating system, execution environment, or application).

In the example embodiment, edge devices 112a-112n may be a fleet of devices that have the same hardware and/or software configuration (e.g., at least a certain number and/or type of hardware components are installed and/or one or more particular operating systems, execution environments, or applications are installed). Therefore, edge devices 112a-112n may the same type of edge device (Type A).

In embodiments, an execution environment, operating system, software application, or any other software code may include any number of different software components that may each be updated (e.g., by applying different software patches that apply to each software component). For example, a given update may be applied only to one component of an operating system that includes many different software components. In some embodiments, an execution or runtime environment, operating system, software application, or any other software code may be considered one software component itself.

As depicted, the update deployment service 104 includes a management interface 120 (e.g., a management API) that may receive user input (e.g., selections) from a management device 121 of a remote client network 110 (e.g., via a user interface of the management device, a command line interface, API commands or requests, etc.). For example, a user may provide input via a graphical user interface or command line interface of a display device. As shown, the management interface 120 receives user input from the management device 121 of the client network 110a of a client.

In some embodiments, the user input may provide permission for the update deployment service to perform automatic deployment of updates. After obtaining permission, the service may perform the automatic deployment of updates, as described herein. In such embodiments, if the service does not receive permission, then the service may notify the client of newly released updates, without automatically deployment them. The client may then decide whether to deploy the updates to any of the client's edge devices (e.g., through a manual process).

The update deployment service 104 may receive input from a user to configure/set an upper limit for the increase in usage of any number of edge components (caused by application of a given update to a software component for a type of edge device) and/or an upper limit for the usage of any number of edge components after the application of a given update to the software component (e.g., a component of an operating system or execution environment).

Regarding a limit for increase in usage, a user may set a limit for the increase in usage of a hardware component (e.g., 5% increase in memory usage) or a code component (e.g., 2 more threads) by software component A for Type A edge devices caused by application of a given update to software component A. In embodiments, a user may set a limit of 5% for the increase in total usage of a hardware component (e.g., memory) or total usage of a code component (e.g., total number of threads used) for Type A edge devices caused by application of a given update to software component A.

Regarding a limit for usage, a user may set a limit of 10% for the usage of a hardware component (e.g., memory) for Type A edge devices by software component A after the application of a given update to software component A. In embodiments, a user may set a limit of 10% for the total usage of a hardware component (e.g., memory) for Type A edge devices after the application of a given update to software component A.

For any given software component for a type of edge device, the update deployment service 104 may assign the limit for increase in usage and/or for usage for any number of edge components in the edge device types 122 data store. In the depicted example, edge device types 122 stores configuration data for multiple software components of Type A 124 edge devices, including software component A 126. In embodiments, for any given software component for a type of edge device, the update deployment service 104 may assign a default limit for increase in usage and/or for usage for any number of edge components in the edge device types 122 data store (e.g., in case a user has not provided input to configure/set the limit).

As shown, the usage limit 128a (e.g., usage of 10%) may be assigned to hardware component 130a (e.g., memory), the usage limit 128b (e.g., usage of 15%) may be assigned to hardware component 130b (e.g., hard disk), and the usage limit 128n (e.g., 4 threads) may be assigned to code component 130n (e.g., threads) in response to client/user input. In some embodiments, this may indicate that the client wishes to deploy a subsequently released update for component A of Type A edge devices only if the memory usage by component A after the update remains within 10% of total memory usage, the hard disk usage by component A after the update remains within 15% of total hard disk usage, and the maximum number of concurrently executing threads is used by component A is 4 or less. As discussed herein, the usage limits may instead apply to total usage of an edge component by the edge device instead of usage of the edge component by software component A itself, in embodiments.

As another example, the limits 128 may instead by limits for increase in usage of edge components caused by application of a given update to the software component. For example, the usage limit 128a (e.g., 5%) may be a limit for increase in usage of the hardware component 130a (e.g., memory), the usage limit 128b (e.g., 5%) may be a limit for increase in usage of the hardware component 130b (e.g., hard disk), and the usage limit 128n (e.g., 2 threads) may be a limit for increase in usage of the code component 130n (e.g., threads). This may indicate that the client wishes to deploy a subsequently released update for component A of Type A edge devices only if the increase in memory usage by component A caused by application of the update remains within a 5% increase, the increase in hard disk usage by component A caused by application of the update remains within a 5% increase, and the increase in the number of concurrently executing threads caused by application of the update is 2 or less. As discussed above, the limits for increase in usage may instead apply to increase in total usage of an edge component by the edge device instead of increase in usage of the edge component by software component A itself, in embodiments.

In the depicted embodiment, the edge device types 122 may store configuration data for any number of edge devices of a client. For example, the edge device types 122 may store configuration data for edge device types B, C, D, and E. Similar to the configuration data for Type A, the edge device types 122 may store configuration data for any number of software components for each of the other edge device types. Since different types of software may or may not be installed on different types of edge devices, any number of the software components of edge device types B, C, D, and E may be different (or the same) as the software components of Type A devices. For example, edge device types 122 may store configuration data for software components X, Y, and Z for edge device Type B, which may not be installed on Type A devices.

At a point in time after the usage configuration for a software component has been completed by a client/user and stored, an update for the software component (e.g., software component A on type A devices) may become available. The increase in usage and/or usage of edge components for a type of edge device may be determined (e.g., based on testing and/or analysis) in order to generate edge usage data. In the depicted example, a software update tester 132 receives an update for software component A. In embodiments, the update may be provided to the software update tester 132 by an administrator/user or service of the provider network when the software update is ready to be released/deployed.

The software update tester 132 may perform any number of tests using Type A test edge devices and/or using testing/simulation software to generate edge usage data for the update for software component A. The edge usage data may indicate the increase in usage of each of the edge components 130 caused by application of the update to software component A or the usage for each of the edge components 130 after the application of the update to software component A. In some embodiments, the update deployment service may instead obtain the edge usage data from another source, such as a testing service of the provider network or a user/administrator of the provider network.

In response to receiving the edge usage data, the update deployer 134 may determine, for each of the hardware components 130, whether the increase in usage or the usage indicated by the edge usage data is within the limit 128 assigned to the edge component. For example, the update deployer 134 may determine whether the usage of edge component 130*a* is within the limit 128*a* and whether the usage of edge component 130*n* is within the limit 128*n*. In embodiments, the above determination may be made for any other number of hardware components.

In response to determining, for each of the edge components 130, that the increase in usage or the usage indicated by the edge usage data is within the limit 128 assigned to the edge component, the update deployer 134 may deploy the update to any number of edge devices of the type of edge device. For example, if only edge components 130*a* and 130*n* are checked for limits (e.g., based on user input/configuration), then in response to determining that the usage of edge component 130*a* is withing the usage limit 128*a* and that the usage of edge component 130*n* is withing the usage limit 128*n*, the update deployer 134 may deploy the update to edge devices 112*a*-112*n* (all of the client's Type A devices). The update is then applied to the software component 118*a* at each of the Type A edge devices 112.

In embodiments, if the edge usage data indicates that any of the limits are exceeded, then the update may not be deployed. In response to determining, for one or more of the edge components 130, that the increase in usage or the usage indicated by the edge usage data is not within the limit 128 assigned to the edge component, the update deployer 134 may not automatically deploy the update to any of edge devices of the type of edge device. Instead, the service may notify the client that the update is available for deployment and/or that one or more of the usage limits was exceeded.

As an example, if only edge components 130*a* and 130*n* are checked for limits (e.g., based on user input/configuration), then in response to determining that the usage of edge component 130*a* is not within the usage limit 128*a* or that the usage of edge component 130*n* is not within the usage limit 128*n*, the update deployer 134 may not deploy the update to the edge devices and may also notify the client that the update is available for deployment and/or that one or more of the usage limits was exceeded.

In various embodiments, usage limits for different edge components or combinations of edge components may be checked for different software components for the same type of edge device (e.g., based on user input/configuration). For example, the update deployer may check usage limits for memory and hard disk when determining whether to deploy an update to software component A for Type A devices, but the update deployer may check usage limits for memory, CPU, and an I/O component when determining whether to deploy another update to software component B for Type A devices.

In various embodiments, any of the above actions may be performed with respect to any other software components for the type of edge device (e.g., Type A devices) and/or for any other software components for a different type of edge device (e.g., Type E devices) in order to determine whether to deploy an update for another software component. For example, a user may configure other usage limits for software component X of edge device Type Y and the other usage limits may be for any number and combination of the same and/or different edge components.

The deployment of an update to different edge devices may occur in waves, in some embodiments. For example, the service may first deploy an update to a first subset of edge devices of a particular type (e.g., 10 devices), and deployment of any number of remaining subsets to the edge devices may be delayed to one or more future times. For example, one hour later the service may deploy the update to 100 more of the edge devices of the particular type, two hours later the service may deploy the update to 1000 more of the edge devices of the particular type, and 4 hours later the service may deploy the update to the remaining edge devices of the particular type. Any number of waves and any amount of time delays between waves may be used.

In some embodiments, the service may indicate to a client any information that may be of interest regarding an update (e.g., update status for the target edge devices). For example, at some time after deployment of an update has begun, the service may indicate, to a client (e.g., in response to a request from the client), an amount of the edge devices that the update was successfully applied to and/or an amount of the edge devices that the update was has not yet been applied to and/or an amount of the edge devices in which the application of the update failed. The service may update this information as more devices are updated to indicate the progress of the update. A graph or other visualization may be provided to the client to provide a visual indicator of the update progress across a large group of devices.

Note that in embodiments, different clients may assign different usage limits for the same components installed on the same types of edge devices. For example, one client may assign a usage limit of 10% for memory for software component A for their Type A edge devices, whereas another client may assign a usage limit of 20% for memory for software component A for their own Type A edge devices. This allows a high degree of flexibility for different clients to configure update deployments according to their own tolerances.

Figure 2:
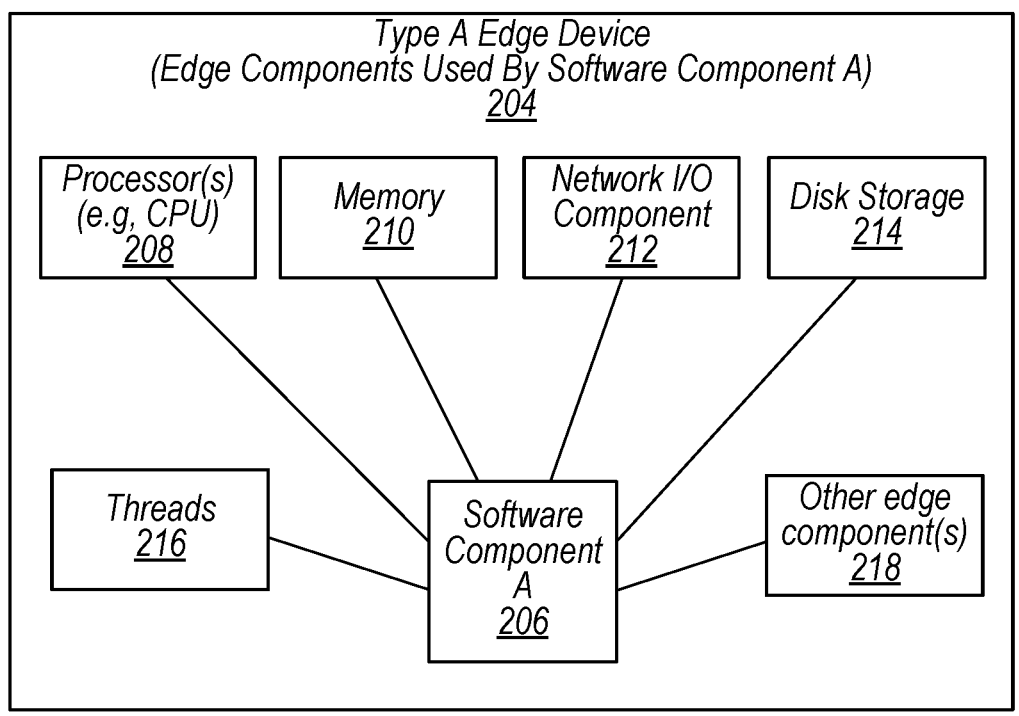
FIG. 2 is a logical block diagram illustrating edge components of an edge device that are used by a software component, according to some embodiments.

FIG. 2 is a logical block diagram illustrating edge components of an edge device that are used by a software component, according to some embodiments.

In the depicted example, an edge device 204 (e.g., Type A edge device of FIG. 1) includes software component A 206 that uses different edge components of the edge device 204 (for execution, configuration, etc.). As depicted, the edge components include hardware components (one or more processors 208 (e.g., a CPU), memory 208, a network I/O component 212 (e.g., network interface), and disk storage 214) and a code component (threads 216). In embodiments, any type of long-term storage/non-volatile media may be used as disk storage (or instead of disk storage). In embodiments, software component A 206 may also use any number of other edge components 218 of the edge device 204 (any number of hardware components and/or code components).

In embodiments, the edge usage data of FIG. 1 may include any of the usage metrics for a given update to software component A described herein for any number of the edge components of the edge device 204. For example, the metrics may include amount of memory 210 used, amount of processor(s) 208 used, amount of disk storage 214 used, amount of bandwidth used by the network I/O component 212, number of threads 216 concurrently executing, and/or usage metrics for any number of other edge components 218.

FIG. 3 is an illustration of a user interface for a client to indicate the type of edge device to set usage limits for, according to some embodiments.

In the depicted example, the update deployment service provides a graphical user interface 302 for a user to select a particular type of edge device from among multiple different types that are available for selection. As shown, different types edge devices are configured with a different combination of hardware components and/or software components. For example, the first two rows are for the same type of hardware configuration (e.g., the same hardware components are used), but they have a different software configuration (e.g., different operating system, execution environment, and/or other applications are installed).

In some embodiments, the list of edge device types represents the types of edge devices for which the update deployment service will provide edge usage data for any new software updates that are released/made available. In embodiments, a user may submit a request (e.g., via the service management interface) to add a new type of edge device to the list. As shown, the user has selected the type of edge device indicated in the second row (the type of edge device with hardware configuration A and software configuration B).

Figure 4:
FIG. 4 is an illustration of a user interface for a client to indicate edge components and corresponding usage limits for a software component of a type of edge device, according to some embodiments.

FIG. 4 is an illustration of a user interface for a client to indicate edge components and corresponding usage limits for a software component of a type of edge device, according to some embodiments.

As shown, the update deployment service provides a graphical user interface 402 for a user to select, for a particular type of edge device (e.g., Type A) and software component (e.g., software component A), one or more particular edge components from among multiple edge components available for selection. In the example, the user has selected all five edge components displayed on the interface 402 (memory, CPU, disk, network I/O component, threads).

The user has also indicated usage limits to be used for each edge component. As depicted, the user has selected a 25% limit for memory, a 10% limit for CPU, a 30% limit for disk, and a 20% limit for a network I/O component, and a 4 thread limit for number of concurrently executing threads. After the user requests that these limits are applied (e.g., clicking on a Apply button), the update deployment service may assign the limits for increase in usage of the edge components and/or assign the limits for the usage of the edge components caused by application of a given update to software component A for Type A edge devices.

As discussed above, the limits may be for the increase in usage of the edge component by the software component or for the increase in total usage of the edge component by the edge device. Similarly, in various embodiments, the limits may be for usage of the edge component by the software component or for total usage of the edge component by the edge device. In some embodiments, any combination of the above types of limits for the different edge components may be used. For example, a user may specify a limit for increase in usage of the memory and CPU by software component A, and specify a limit for the increase in total usage of the disk and network I/O component.

In some embodiments, the user may specify any number of the above types of limits for any given edge component that are to be checked by the update deployment service to determine whether to deploy any new updates that become available. For example, the user may specify a limit for increase in usage of memory by software component A for the memory and CPU, a limit for the increase in total usage of the memory, a limit for usage of the memory by software component A, and/or a limit for total usage of the memory.

At any subsequent time after the limits have been assigned, any number of the limits assigned to edge components may be changed via user/client input and in response, the updated limits will be assigned to the edge components. For example, any number of updates may be automatically deployed (or prevented from automatic deployment) based on checking the initially assigned limits shown in FIG. 4. At a later point, the client may change the limits for the memory, CPU, disk, and/or network I/O component.

After the limits are updated, any subsequent updates will be automatically deployed (or prevented from automatic deployment) based on checking the updated limits. In other words, the same process described above for determining whether to deploy a given update will be used, except the updated limits will be used instead of the previously assigned limits. In embodiments, the limits may be changed/updated any number of times in response to user/client input. This may allow a client to always have the ability to adjust the criteria for automatic deployment of updates for any particular software component and/or type of edge device.

In an embodiment, at any subsequent time after the limits have been assigned, any number of the limits for additional edge components may be added for consideration for deployment of future updates and/or any edge components that are currently evaluated for usage limits may be removed from consideration for consideration for deployment of future updates via user/client input. For example, any number of updates may be deployed based on checking the initially assigned limits shown in FIG. 4. At a later point, the client may add a new limit for a different disk or an additional code component so that an updated group of edge components (including the additional edge component) is then used in the above determination of whether to deploy subsequent updates.

Conversely, the client may remove an edge component from consideration for deployment of future updates (e.g., by un-selecting a component using the example interface of FIG. 4). An updated group of edge components (a group that no longer includes the un-selected edge component) is then used in the above determination of whether to deploy subsequent updates. This may be another useful way for a client to adjust the criteria for automatic deployment of updates for any particular software component and/or type of edge device.

Figure 5:
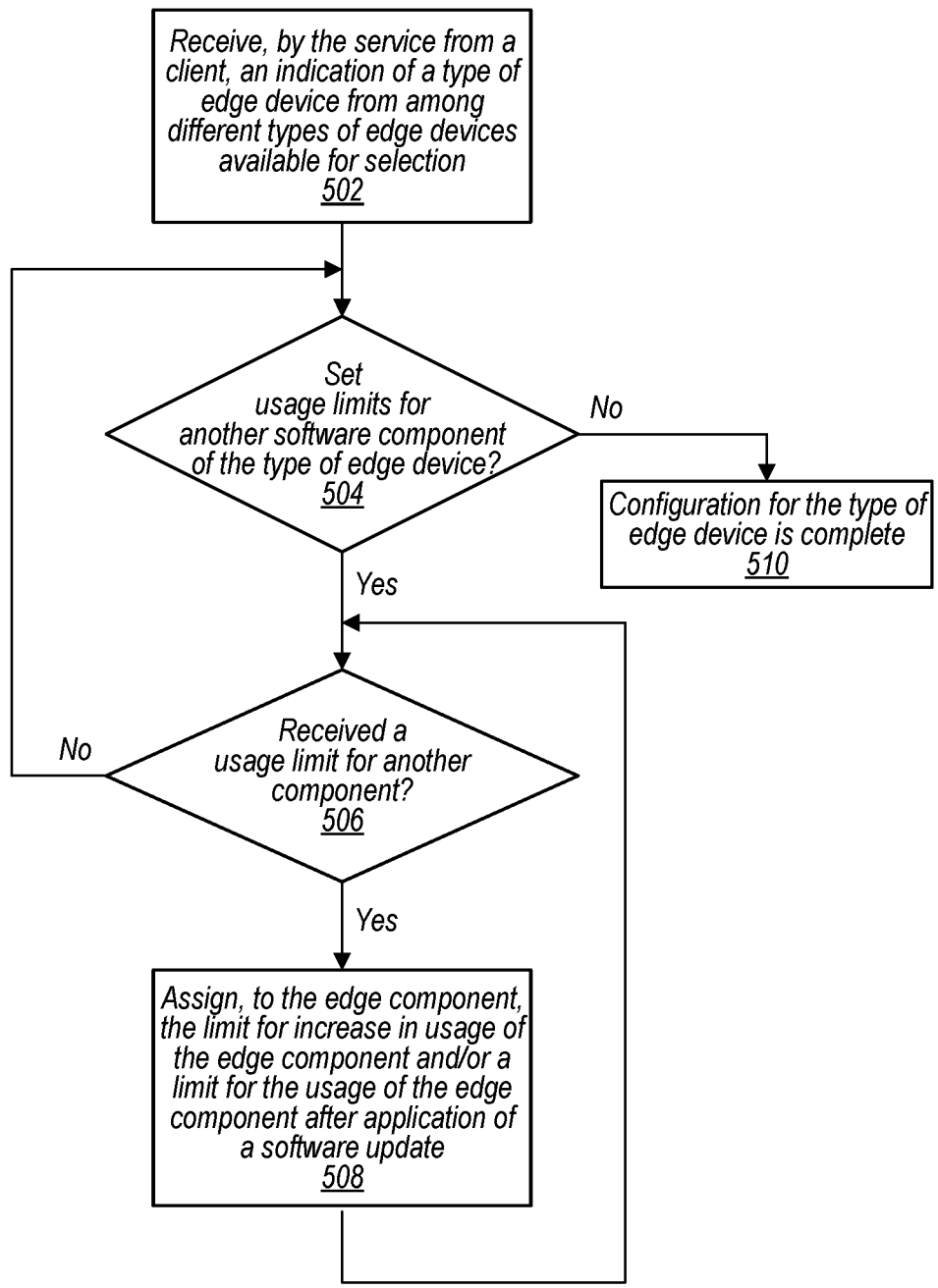
FIG. 5 is a high-level flowchart illustrating various methods and techniques to indicate a type of edge device, software components for the type of edge device, and edge usage limits for updates for each software component, according to some embodiments.

FIG. 5 is a high-level flowchart illustrating various methods and techniques to indicate a type of edge device, software components for the type of edge device, and edge usage limits for updates for each software component, according to some embodiments. In various embodiments, any of the functionality described for any portions of the flowcharts 5-6 may be performed by any of the components of FIGS. 1-4 and/or 7.

Figure 6:
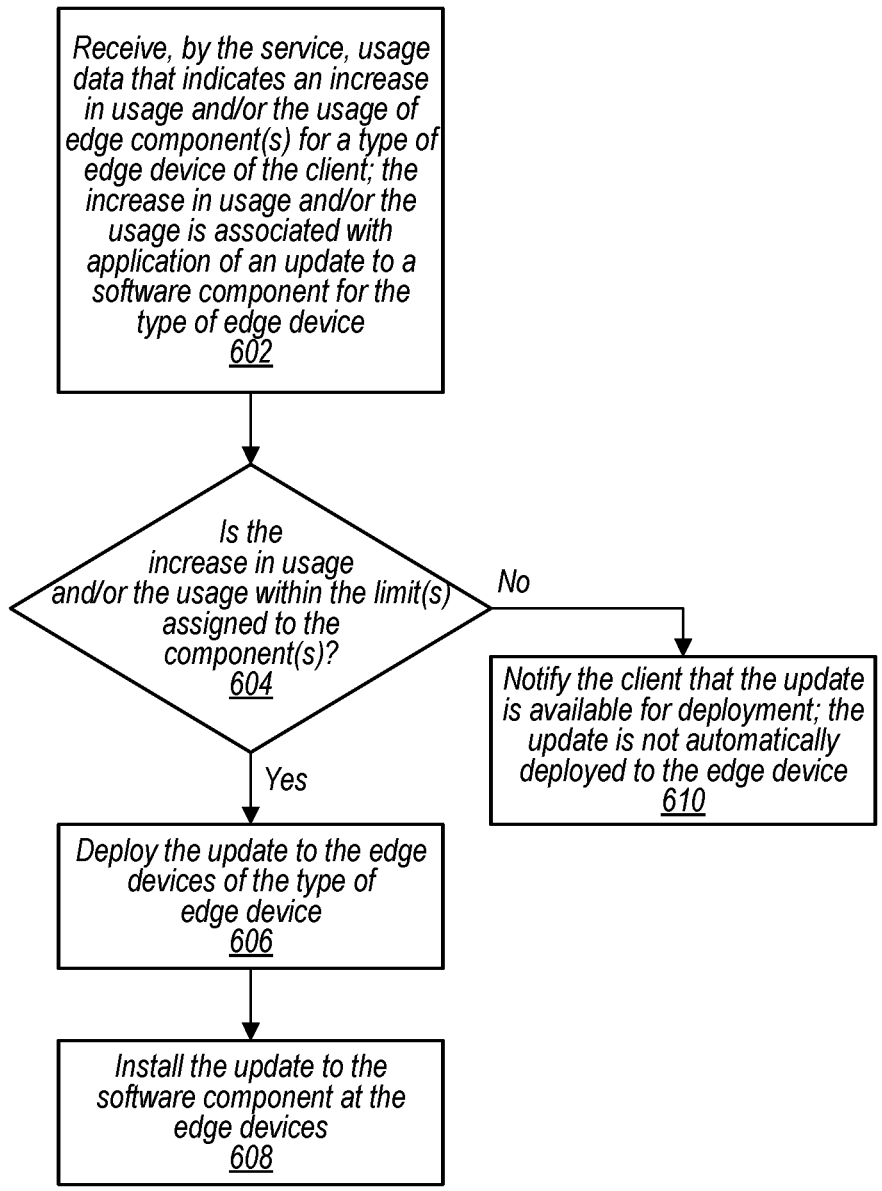
FIG. 6 is a high-level flowchart illustrating various methods and techniques to implement automatic deployment of updates for edge device software components based on edge usage limits, according to some embodiments.

These techniques, as well as the techniques discussed with regard to FIG. 6, may be implemented using components or systems as described above with regard to FIGS. 1-4, as well as other types of components or systems, and thus the following discussion is not intended to be limiting as to the other types of systems that may implement the described techniques. For example, any of the techniques may be implemented by an update deployment service of a provider network and/or by a local service/application of a client network.

At block 502, an update deployment service receives an indication of a type of edge device from among different types of edge devices available for selection. At block 504, the update deployment service determines whether there is another software component of the type of edge device for which edge usage limits are to be set/assigned (e.g., based on user input). If so, then at block 506, the update deployment service determines whether a usage limit was received for another edge component. If so, then at block 508, the service assigns, to the edge component, the limit for increase in usage of the edge component and/or a limit for the usage of the edge component after application of a software update. The process then returns to block 506.

At block 506, if the service determines that no more usage limits were received for the edge component, then the process returns to block 504. At block 504, if the service determines that there are any more software components of the type of edge device for which edge usage limits are to be set/assigned, then at block 510, the configuration of usage limits for the type of edge device is complete.

FIG. 6 is a high-level flowchart illustrating various methods and techniques to implement automatic deployment of updates for edge device software components based on edge usage limits, according to some embodiments.

At block 602, the update deployment service receives edge usage data that indicates an increase in usage and/or the usage of edge component(s) (e.g., hardware component(s) and/or code component(s)) for a type of edge device of the client; the increase in usage and/or the usage is associated with application of an update to a software component for the type of edge device.

At block 604, the service determines whether the increase in usage and/or the usage of the edge component(s) is within the limit(s) assigned to the edge component(s). If so, then at block 606, the service deploys the update to the edge devices of the type of edge device. In embodiments, the usage limit(s) (increase in usage and/or usage) for a given software component that are assigned to edge component(s) of a type of edge device may be referred to as a "usage profile limit" for the given software component. For example, a particular usage profile limit for software component A may include usage limits for four hardware components and one code component (as shown in FIG. 4).

At block 608, the edge devices install the update to the software component. Returning to block 604, if the service determines that the increase in usage and/or the usage of one or more of the edge component(s) is not within the limit(s) assigned to the corresponding edge component(s), then at block 610, the service notifies the client that the update is available for deployment; the update is not automatically deployed to the edge device.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors.

The program instructions may implement the functionality described herein (e.g., the functionality of the update deployment service, other services, edge devices, and any other components/devices that implement the techniques described herein). The various methods as illustrated in the figures and described herein represent example embodiments of methods. The order of any method may be changed, and various elements may be added, reordered, combined, omitted, modified, etc.

Figure 7:
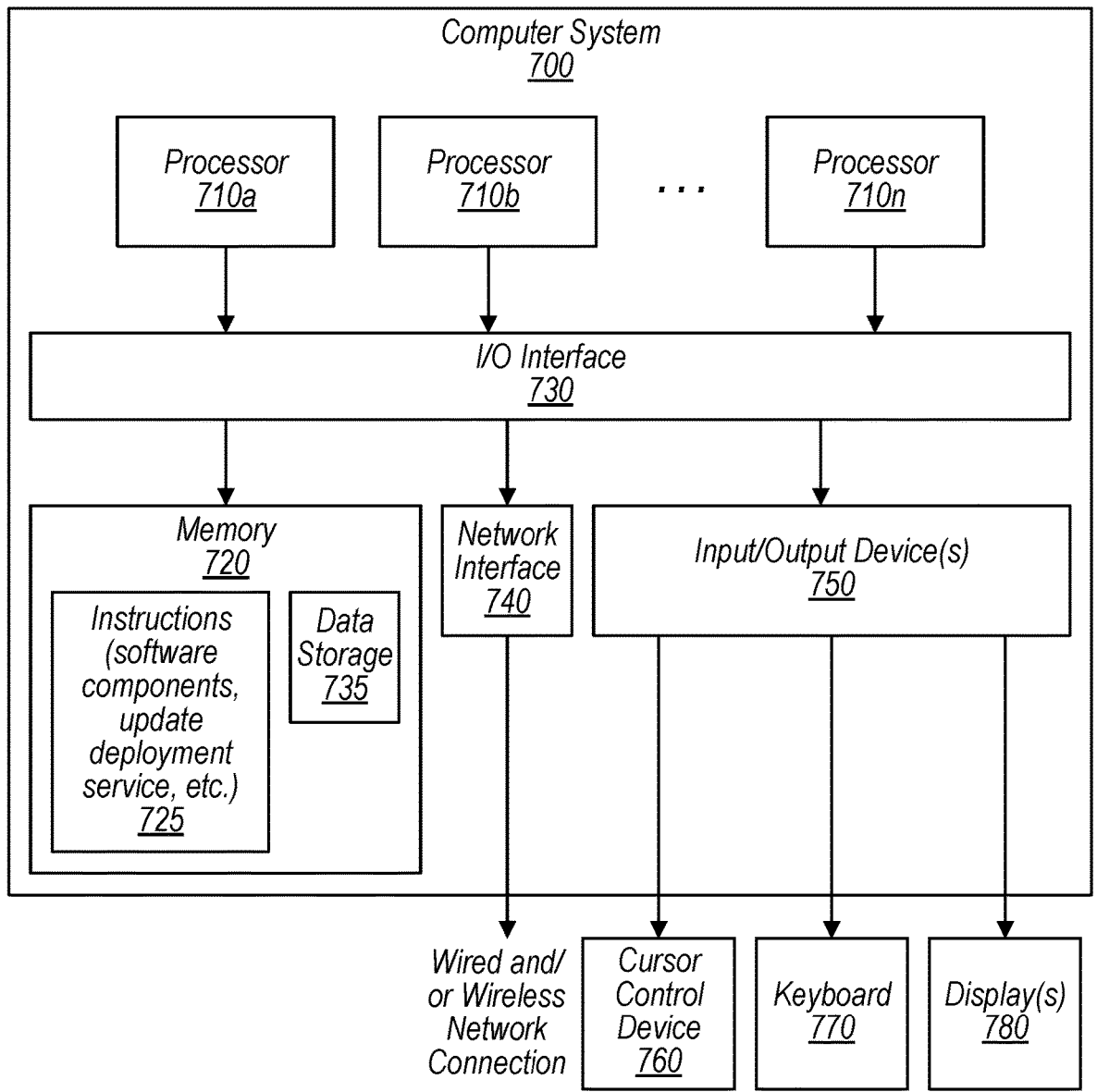
FIG. 7 is a block diagram illustrating an example computing system, according to some embodiments.

Embodiments to implement deploying feature processing units to implement automatic deployment of updates for edge device software components based on edge usage limits as described herein may be executed on one or more computer systems, which may interact with various other systems or devices. One such computer system is illustrated by FIG. 7. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. Display(s) may include standard computer monitor(s) and/or other display systems, technologies or devices, in one embodiment. In some embodiments, it is contemplated that embodiments may be implemented using a single instance of computer system 700, while in other embodiments multiple such systems, or multiple nodes making up computer system 700, may host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions, in one embodiment. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 720 may store program instructions 725 and/or data accessible by processor 710, in one embodiment. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the update deployment service, other services, edge devices, and any other components/devices, etc.) are shown stored within system memory 720 as program instructions 725 and data storage 735, respectively. In other embodiments, program instructions and/or data may be received, sent or stored upon different types of computer-accessible media or on similar media separate from system memory 720 or computer system 700.

A computer-accessible medium may include non-transitory storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740, in one embodiment.

In one embodiment, I/O interface 730 may be coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may allow data to be exchanged between computer system 700 and other devices attached to a network, such as other computer systems, or between nodes of computer system 700, in one embodiment. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700, in one embodiment. Multiple input/output devices 750 may be present in computer system 700 or may be distributed on various nodes of computer system 700, in one embodiment. In some embodiments, similar input/output devices may be separate from computer system 700 and may interact with one or more nodes of computer system 700 through a wired or wireless connection, such as over network interface 740.

As shown in FIG. 7, memory 720 may include program instructions 725 that implement the various embodiments of the systems as described herein, and data store 735, comprising various data accessible by program instructions 725, in one embodiment. In one embodiment, program instructions 725 may include software elements of embodiments as described herein and as illustrated in the Figures. Data storage 735 may include data that may be used in embodiments (e.g., configuration data, usage limits, etc.). In other embodiments, other or different software elements and data may be included.

Those skilled in the art will appreciate that computer system 700 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device.

Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above.

In some embodiments, instructions stored on a computer-readable medium separate from computer system 700 may be transmitted to computer system 700 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more processors and one or more memories, wherein the one or more memories have stored thereon instructions, which when executed by the one or more processors, cause the one or more processors to implement an update deployment service for a plurality of clients of a provider network, wherein the update deployment service is configured to, for a given client:
   receive, from the client, an indication of approval for application of third-party patch updates to a software component of an edge component for a type of edge device and an indication of a limit for:
      increase in usage of at least one edge component for a type of edge device, wherein the at least one edge component comprises at least one of a hardware component or a code component of the edge device, and wherein the increase in usage is caused by application of a given update to the software component for the type of edge device, or
      the usage of the at least one edge component by the software component after the application of the given update to the software component;
   assign the limit to the at least one edge component for the type of edge device;
   receive edge usage data that indicates the increase in usage of the at least one edge component caused by application of a third-party patch update to the software component or the usage for the at least one edge component after the application of the third-party patch update to the software component;
   determine whether the increase in usage of the at least one edge component of the edge device or the usage of the at least one edge component of the edge device is within the limit assigned to the at least one edge component of the edge device; and
   in response to a determination that the increase in usage of the at least one edge component of the edge device or the usage of the at least one edge component of the edge device is within the limit assigned to the at least one edge component of the edge device, deploy the third-party patch update to a plurality of edge devices of the type of edge device, wherein the third-party patch update is configured to be applied to the software component of the plurality of edge devices.

2. The system as recited in claim 1, wherein the update deployment service is further configured to, for the given client:
   in response to a determination that the increase in usage or the usage is not within the limit assigned to the at least one edge component, notify the client that the third-party patch update is available for deployment, wherein the third-party patch update is not automatically deployed to the plurality of edge devices.

3. The system as recited in claim 1, wherein the update deployment service is further configured to, for the given client:
   receive, from the client, an indication of another limit for:
      increase in usage of the at least one edge component for the type of edge device caused by application of a given update to another software component for the type of edge device, or
      the usage of the at least one edge component by the other software component after the application of the given update to the other software component;
   assign the other limit to the at least one edge component for the type of edge device;
   receive edge usage data that indicates the increase in usage of the at least one edge component caused by application of another third-party patch update to the other software component or the usage for the at least one edge component after the application of the other third-party patch update to the other software component;

determine whether the increase in usage caused by the application of the other third-party patch update to the other software component or the usage by the other software component is within the other limit assigned to the at least one edge component; and in response to a determination that the increase in usage caused by the application of the other third-party patch update to the other software component or the usage by the other software component is within the other limit, deploy the other third-party patch update to the plurality of edge devices.

4. The system as recited in claim 1, wherein the at least one edge component comprises one or more particular hardware components, and wherein the update deployment service is further configured to:

receive, from the client, a selection of the one or more particular hardware components from among a plurality of hardware components available for selection, wherein one or more of the plurality of hardware components available for selection are not selected by the client.

5. The system as recited in claim 1, wherein the edge usage data comprises usage metrics for one or more of:

memory for the type of edge device,
a central processing unit for the type of edge device,
disk storage for the type of edge device,
a network input/output component for the type of edge device, or
concurrently executing threads.

6. A method, comprising:

performing, by one or more computing devices of a provider network:

receiving edge usage data that indicates an increase in usage or the usage of at least one edge component for a type of edge device of a client of the provider network, wherein the at least one edge component comprises at least one of a hardware component or a code component of the edge device, wherein the increase in usage or the usage of the at least one edge component is associated with application of an update to a software component for the type of edge device;

determining whether the increase in usage of the at least one edge component of the edge device or the usage of the at least one edge component of the edge device is within a limit assigned to the at least one edge component of the edge device; and in response to determining that the increase in usage of the at least one edge component of the edge device or the usage of the at least one edge component of the edge device is within the limit assigned to the at least one edge component of the edge device, deploying the update to a plurality of edge devices of the type of edge device, wherein the update is configured to be applied to the software component of the plurality of edge devices.

7. The method as recited in claim 6, wherein the increase in usage comprises increase in usage of the at least one edge component by the software component or increase in total usage of the at least one edge component caused by application of the update to the software component, and wherein the usage comprises usage of the at least one edge component by the software component or total usage of the at least one edge component after the application of the update to the software component.

8. The method as recited in claim 6, further comprising:

receiving other edge usage data that indicates an increase in usage or the usage of a plurality of edge components for the type of edge device, wherein the increase in usage or the usage of the plurality of edge components is associated with application of another update to another software component for the type of edge device;

determining whether the increase in usage or the usage of the plurality of edge components is within another limit assigned to the plurality of edge components; and in response to determining that the increase in usage or the usage of the plurality of edge components is within the other limit assigned to the plurality of edge components, deploying the other update to the plurality of edge devices.

9. The method as recited in claim 8, wherein the plurality of edge components comprises at least an additional edge component not included in the at least one edge component.

10. The method as recited in claim 6, wherein the at least one edge component comprises a plurality of edge components, and further comprising:

receiving, from the client, an indication of a different limit to be assigned to one or more of the plurality of edge components;

assigning updated limits to the plurality of edge components based on the different limit to be assigned to one or more of the plurality of edge components;

receiving additional edge usage data that indicates an increase in usage or the usage of the plurality of edge components, wherein the increase in usage or the usage of the plurality of edge components is associated with application of an additional update to the software component;

determining whether the increase in usage or the usage is within the updated limits assigned to the plurality of edge components; and in response to determining that the increase in usage or the usage is within the updated limits assigned to the plurality of edge components, deploying the additional update to the plurality of edge devices.

11. The method as recited in claim 6, wherein the at least one edge component comprises a plurality of edge components, and further comprising:

receiving, from the client, an indication of an additional edge component for the type of edge device and an additional limit to be assigned to the additional edge component for increase in usage or the usage of the additional edge component, resulting in an updated plurality of edge components to be used for consideration for subsequent updates;

assigning the additional limit to the additional edge component;

receiving additional edge usage data that indicates another increase in usage or another usage of the updated plurality of edge components, wherein the other increase in usage or the other usage of the updated plurality of edge components is associated with application of an additional update to the software component;

determining whether the other increase in usage or the other usage is within limits assigned to the updated plurality of edge components; and in response to determining that the other increase in usage or the other usage is within limits assigned to the updated plurality of edge components, deploy the additional update to the plurality of edge devices.

12. The method as recited in claim 6, further comprising: receiving, from the client, a selection of the type of edge device from among a plurality of types of edge devices available for selection, wherein different types of the plurality of types of edge devices are associated with a different combination of edge components and/or software components.

13. The method as recited in claim 6, wherein the edge usage data comprises usage metrics for one or more of:
memory for the type of edge device,
a central processing unit for the type of edge device,
disk storage for the type of edge device,
a network input/output component for the type of edge device, or
concurrently executing threads.

14. The method as recited in claim 6, wherein a different client of the provider network uses another plurality of edge devices of the type of edge device, and further comprising:
determining whether the increase in usage or the usage is within a different limit assigned to the at least one edge component, wherein the different limit is associated with the different client; and
in response to determining that the increase in usage or the usage is within the different limit assigned to the at least one edge component, deploying the update to the other plurality of edge devices.

15. One or more non-transitory computer-accessible storage media storing program instructions that when executed on or across one or more processors of a provider network cause the one or more processors to:
receive edge usage data that indicates an increase in usage or the usage of at least one edge component for a type of edge device, wherein the at least one edge component comprises at least one of a hardware component or a code component of the edge device, wherein the increase in usage or the usage of the at least one edge component is associated with application of an update to a software component for the type of edge device;
determine whether the increase in usage of the at least one edge component of the edge device or the usage of the at least one edge component of the edge device is within a limit assigned to the at least one edge component of the edge device; and
in response to a determination that the increase in usage of the at least one edge component of the edge device or the usage of the at least one edge component of the edge device is within the limit assigned to the at least one edge component of the edge device, deploy the update to one or more edge devices of the type of edge device, wherein the update is configured to be applied to the software component of the one or more edge devices.

16. The one or more storage media as recited in claim 15, wherein the increase in usage comprises increase in usage of the at least one edge component by the software component or increase in total usage of the at least one edge component caused by application of the update to the software component, and wherein the usage comprises usage of the at least one edge component by the software component or total usage of the at least one edge component after the application of the update to the software component.

17. The one or more storage media as recited in claim 15, wherein the one or more edge devices comprises a plurality of edge devices, and wherein to deploy the update to the one or more edge devices, the program instructions when executed on or across the one or more processors further cause the one or more processors to:
deploy the update to a first subset of the plurality of edge devices, wherein deployment of the update to one or more remaining subsets of the plurality of edge devices is delayed to a future time.

18. The one or more storage media as recited in claim 15, wherein the one or more edge devices comprises a plurality of edge devices, and wherein the program instructions when executed on or across the one or more processors further cause the one or more processors to:
subsequent to the deployment of the update, indicate, to the client, one or more of:
an amount of the plurality of edge devices that the update was successfully applied to, or
an amount of the plurality of edge devices that the update was not successfully applied to.

19. The one or more storage media as recited in claim 15, wherein the at least one edge component comprises a plurality of edge components, and wherein the program instructions when executed on or across the one or more processors further cause the one or more processors to:
receive, from the client, an indication of to remove one of the plurality of edge components from consideration for subsequent updates, resulting in an updated plurality of edge components to be used for consideration for subsequent updates;
receive additional edge usage data that indicates another increase in usage or another usage of the updated plurality of edge components, wherein the other increase in usage or the other usage of the updated plurality of edge components is associated with application of an additional update to the software component;
determine whether the other increase in usage or the other usage is within limits assigned to the updated plurality of edge components; and
in response to a determination that the other increase in usage or the other usage is within limits assigned to the updated plurality of edge components, deploy the additional update to the plurality of edge devices.

20. The one or more storage media as recited in claim 15, wherein the edge usage data comprises usage metrics for one or more of:
memory for the type of edge device,
a central processing unit for the type of edge device,
disk storage for the type of edge device,
a network input/output component for the type of edge device, or
concurrently executing threads.

* * * * *